April 11, 1950     C. W. SANDERSON     2,504,090

METHOD AND APPARATUS FOR TREATING TIRE TREADS

Filed June 12, 1948

INVENTOR.
CLIFFORD W. SANDERSON
BY
ATTORNEY

Patented Apr. 11, 1950

2,504,090

UNITED STATES PATENT OFFICE 2,504,090

METHOD AND APPARATUS FOR TREATING TIRE TREADS

Clifford W. Sanderson, Hudson, Ohio, assignor to Wingfoot Corporation, Akron, Ohio, a corporation of Delaware Application June 12, 1948, Serial No. 32,613

25 Claims. (Cl. 154—9)

This invention relates to vehicle tires and, more particularly, to an improved tread surface for such tires that greatly increases the skid resistant properties, and is applicable to any vehicle tire.

There has in the past been considerable effort spent in attempting to effect a road contact surface of the tire that is resistant to skidding and also provide satisfactory traction for starting and stopping. Primarily these efforts have been expended in developing a skid-resistant tire in several different manners such as tread design, tread compounds, or separate attachments to be applied to the wheel, but up to the present time a completely satisfactory skid-resistant tire has not been available.

Numerous tread designs have been developed that materially increase the skid-resistant properties of the tires by molding protruding designs of various types on the tread surface, but the result has not been entirely satisfactory because the skid-resistant tread design materially decreased the mileage life of the tire.

Many tread compounds have been developed to increase the skid resistance of a tire tread but such compounds are unsatisfactory because considerable mileage life is sacrificed if the tire is originally manufactured with this type of tread compound. If the tire is retreaded or recapped with such a compound, it then involves the dismounting of the tire and either using another tire while the other tire is being processed or laying up the car for that period. The inconvenience and delay caused by this method in addition to the relatively high expense to perform this operation prevents a large number of people from availing themselves of the added protection offered.

Many separate devices that are to be attached to the tire or wheels have been developed but have never been very successful due to the difficulties encountered in applying and removing such devices. Generally such devices are only helpful in snow, mud, ice, etc. and do not offer any assistance on wet pavements. Such devices are not satisfactory for permanent or seasonable mounting on a vehicle but have to be applied when certain conditions are present and removed as those conditions pass. Numerous devices of this type cause severe riding discomfort as well as undue mechanical strains on the vehicle.

It is an object of this invention to avoid the previous difficulties and at the same time produce a better skid-resistant tire tread surface than has been heretofore possible.

Another object of this invention is to provide a simple and inexpensive method of producing a highly skid-resistant tire tread.

Another object of this invention is to provide a highly skid-resistant tire tread that will show no substantial reduction in mileage.

A further object of this invention is to provide a method of producing a highly skid-resistant tire tread that is applicable to any tire.

A still further object of this invention is to provide a skid-resistant tire tread surface that will not pick up foreign material easily and eventually penetrate the carcass and cause injury thereto.

Other objects of this invention will hereinafter appear as the description thereof proceeds, the novel features, arrangements and combinations being clearly pointed out in the specification and in the claims thereunto appended.

Figure 1:
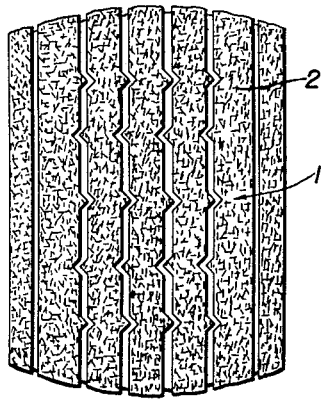
Fig. 1 is a fragmentary plan view of a tire tread treated according to the invention.

In Fig. 1, a vulcanized tire tread 1 of rib design is used for the purpose of illustration but it is to be understood that this invention may be applied to any tire tread design and is not limited to any particular manufacturer's tire. A multitude of lacerations 2 of minute cross-section are arranged in closely massed relation in the road-contacting surface of the vulcanized tire tread 1. Their spacing will depend upon the particular method and/or apparatus by which they are produced. They need not be regularly spaced in their closely massed relation to provide the tread with the desired improved traction properties, and they have been shown in irregular spaced relation because the particular methods and apparatus hereinafter described are such as will produce irregular spacing of the lacerations in the course of repeated treatment of the tire tread. The lacerations 2 present a multiplicity of sharp edges to the road surface as the tire tread contacts the road because the deformation of the tire tread, due to load, slightly opens the lacerations and the contact of the sharp edges with the road surface materially increases the ability of the tire to "stick" to the road, thus preventing skidding, and also improves the ability to stop or start on slippery roads. The opening of the lacerations 2 is not sufficient to cause undue tread wear so as to cause a material reduction in the tread mileage of the tire but tires that have been treated in this manner have shown a remarkable increase in the skid-resistant properties over other types.

Figure 2:
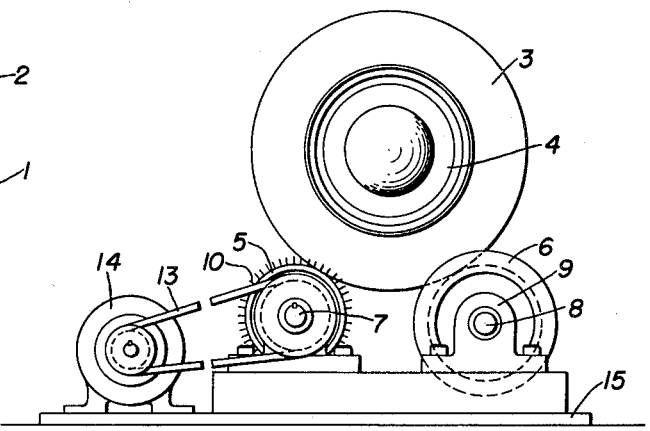
Fig. 2 is a front elevation of an apparatus forming part of my invention.
Figure 3:
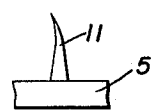
Fig. 3 is an enlarged view of one of the elements used for treating a tire tread.
Figure 4:
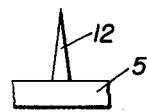
Fig. 4 is an enlarged view of another form of the elements used for treating a tire tread.
Figure 5:
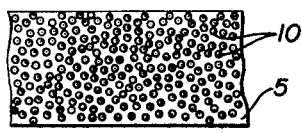
Fig. 5 is a developed view showing the arrangement of the elements.

Fig. 2 illustrates one embodiment of an apparatus used to produce the lacerated tread surface as shown in Fig. 1. In this appartus the tire 3, mounted on the wheel 4, is supported by the rolls 5 and 6 which are secured on shafts 7 and 8 respectively which, in turn are rotatably supported by the bearings 9 at each end of the shaft. The surface of roll 5 comprises a multiplicity of sharp small tread-piercing projections or lacerating pins 10 which are of such a length as not to penetrate more than the thickness of the tread but preferably the pins 10 are of such a length as to lacerate only to the depth approximately equal to the normal tread wear during the winter months, whereby the slight reduction of tire mileage due to this treatment is not effective any longer than necessary. Roll 6 is a transversely curved surface idler roll which provides additional support and centering or guiding means for the tire 3 while the tread surface is being treated, but any type of idler roll may be used with effective results. The pins 10 may be of any desired shape so as to pierce the tread of the tire when it is rotated against the surface of the roll 5, and Figs. 3 and 4 illustrate two types of pins 10 that will produce a satisfactory tread surface although it is not intended to limit the types of pins to the illustrated shapes. The pin 11, as illustrated in Fig. 3, has a slight hook-like contour at the outer extremity extending preferably in the direction of the axis of rotation of the roll 5, with some extending in the opposite direction of the others, and the pin 12 illustrated in Fig. 4 is a straight conical section. The pins 10 are preferably haphazardly arranged on the surface of the roll 5 as illustrated in Fig. 5 so as to assist in preventing the pins from re-entering previously made lacerations on successive revolutions, but a uniform arrangement of the pins may be used with effective results.

As illustrated in Fig. 2, the roll 5 may be rotated by a belt or chain 13 driven by the motor 14 which in turn rotates the tire tread 1 in contact with the pins 10 at substantially the same peripheral speed as the surface of the roll 5. The roll 6 provides additional support for the tire tread and aids in maintaining the alignment and contact of the tread surface 1 with the roll 5. It is not essential that roll 5 be the driven roll but roll 6 may be driven or the power of the automobile may be used to drive the wheel 4 which in turn rotates the tire 3 and tread 1 against the rolls 5 and 6. By using the power of the automobile to drive a tire tread against the rolls, the necessity of providing an independent driving means for either roll is eliminated. The assembly of motor 14 and rolls 5 and 6 is mounted on a base 15 for ease of handling in moving from one position to another.

Figure 6:
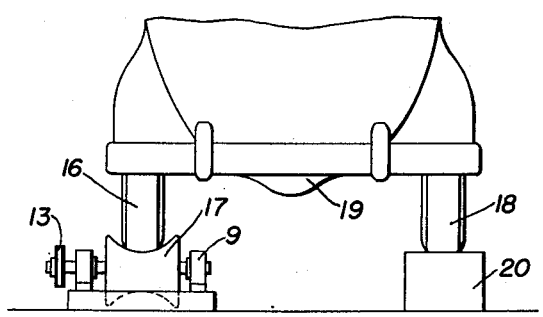
Fig. 6 is a diagrammatic end view illustrating the method of treating tires on an automobile.

By the use of an apparatus as illustrated in Fig. 2, the tires or wheels do not need to be removed from their respective positions on the vehicle but may be treated simply and quickly while in their positions. Fig. 6 illustrates one method of accomplishing this in which the tire tread 16 is placed in position on the roll assembly 17 (as illustrated in Fig. 2) and the tire 18 on the opposing end of the vehicle axle 19 is supported by a block 20 so that the rear axle 19 remains substantially parallel to the ground. The tire tread 16 is thus rotated against the surface of roll 5 at substantially the same peripheral speed by either using the power of the vehicle or by the independent driving means, for example the motor 14. The tire tread 16 is rotated against the pins of the roll 5 until the tread is sufficiently lacerated, then the apparatus is moved in position to treat the other tire 18 and the block 20 is placed under the tire 16, then the process is repeated. Of course, it is necessary to provide an independent driving means if the front tires of the vehicle are to be treated without altering their position on the vehicle or the front wheels may be substituted for the rear wheels and the power of the vehicle used to process the tire treads as previously described.

It is to be understood, however, that several of these apparatuses may be used in order to treat more than one tire tread simultaneously in order to reduce the time required to process the tires of one vehicle. It is not essential that the tires be mounted on the vehicle to be treated according to the practices of this invention but may be treated while dismounted if provisions are made to apply sufficient pressure to the tire or wheel so that the pins will pierce the tread to the required depth.

Figure 7:
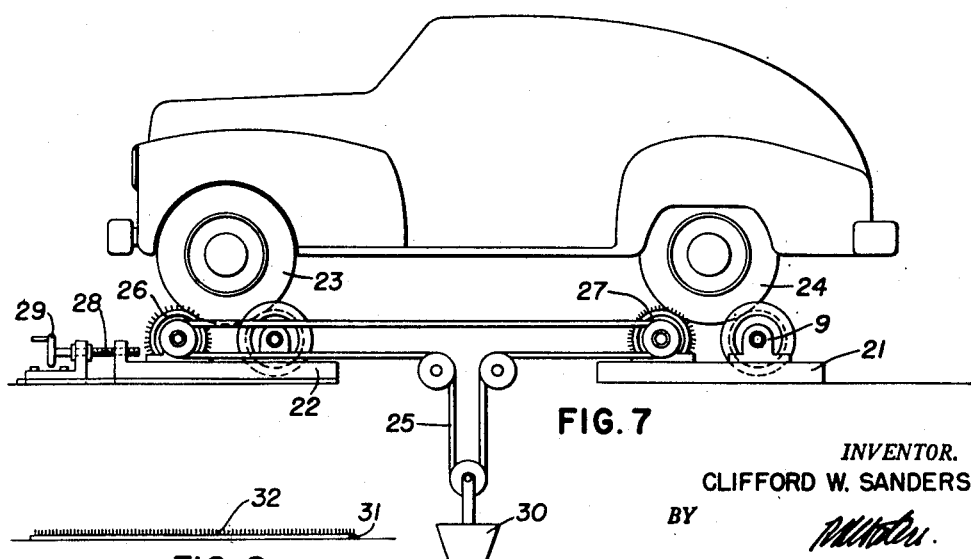
Fig. 7 is a diagrammatic side view illustrating another method of treating tires on an automobile.

Fig. 7 illustrates another method of processing at least two tires of a vehicle simultaneously while mounted on the vehicle. Two roll assemblies 21 and 22 (as illustrated in Fig. 2) are positioned under the front wheels 23 and rear wheels 24 on the same side of the vehicle and a chain or belt 25 rotates the roll 26 of assembly 22 simultaneously with the rotation of roll 27 of assembly 21, which is preferably rotated in turn by the power of the vehicle as previously described. Preferably the assembly 22 is mounted so as to be adjustable linearly, for example the screw thread 28 rotatable by hand wheel 29, so as to provide means for positioning the assembly 22 to accommodate the various differentiations in the vehicle wheel bases of the various vehicles, and the proper tension on the chain 25 is maintained by the counterweight 30. An independent driving means may be used to drive the roll 26 or 27 if desired.

Figure 8:
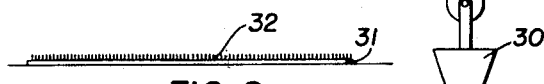
Fig. 8 is a diagrammatic side view illustrating another apparatus forming part of my invention.

Fig. 8 illustrates a further embodiment of the invention in the plate 31 which has a surface of pins 32 similar to those previously described in Figs. 3 and 4, and preferably the plate 31 is at least slightly greater in length than the circumference of the tire that is to be treated. The tire tread surface may be lacerated by driving the vehicle back and forth over the pins 32 of the plate 31 until the desired degree of lacerating is obtained.

In the treating of a tire tread to produce a skid resistant tire with the apparatus as illustrated in Figs. 2, 6, 7 and 8, the tread of the tire is rotated in contact with the surface of the roll comprising numerous pins that pierce the tread to the depth of the pins. The tread surface and roll are rotated at substantially the same speed until a multitude of closely massed pinhole lacerations are produced in the tread surface. The pins produce a slight tear or jagged cut in the tire elongated in a generally circumferential direction due to the change of the angle of the pin with respect to the tread between the entering and leaving point of the pin so that the lacerations thus produced are of pinhole-like form and are irregular in shape and size. The treating of tires by this method is not limited to any particular size or type but may be applied to any tire as long as there is sufficient thickness of tread material remaining so that the pins will not pierce the carcass or body of the tire. There are no special preparatory steps necessary to treat a tire by this method so that the tire may be immediately treated even if the tread surface is wet when it is ready for treatment. The same lacerating effect may be accomplished by rotating a tire tread surface over a single roll with a surface comprised of a multiplicity of pins. In all of the embodiments of the invention, the pins may be heated to aid in the piercing of the tread.

Although I have herein disclosed specific embodiments of my invention, I do not intend to limit myself thereto, but to include all of the obvious variations and modifications within the spirit and scope of the appended claims.

Having thus fully described my invention, what I claim and desire to secure by Letters Patent of the United States is:

1. The method of producing an improved skid-resistant tire tread comprising the steps of impinging a multiplicity of sharp lacerating elements against the periphery of the tread after it is vulcanized so as to pierce the tread whereby a multitude of irregularly and minutely spaced lacerations in massed relation are produced in the road-contacting surface of the tread.

2. The method of producing an improved skid-resistant tire tread comprising the steps of rotating the road-contacting surface of a vulcanized tire tread against a multiplicity of sharp lacerating elements carried by a rotatable element and at substantially the same peripheral speed as said rotatable element so as to cause said lacerating elements to pierce the tread, whereby a multitude of irregularly and closely spaced lacerations in massed relation are produced in said tread surface.

3. The method of treating a vulcanized vehicle tire tread comprising the steps of providing a rotatable surface provided with a multiplicity of tread-piercing elements, placing the road-contacting surface of said vehicle tire tread in contact with said rotatable surface, and rotating the tire tread and rotatable surface simultaneously and in rolling contact with each other whereby a multitude of irregularly and closely spaced lacerations in massed relation are produced in said tread surface.

4. The method of treating a vulcanized vehicle tire tread comprising the steps of providing a rotatable surface provided with a multiplicity of tread-piercing elements, placing the road-contacting surface of said vehicle tire tread in contact with said rotatable surface, and rotating the tire tread and rotatable surface simultaneously and in contact with each other at substantially the same peripheral speed whereby a multitude of irregularly and closely spaced lacerations in massed relation are produced in said tread surface.

5. The method of treating a vulcanized vehicle tire tread while the tire is mounted on a driven wheel of a power-driven vehicle, comprising the steps of providing a rotatable surface having a multiplicity of tread-piercing elements, placing the road-contacting surface of said tire tread in contact with said rotatable surface and rotating said rotatable surface by the vehicle power means through the tire whereby said rotatable surface and tire tread are rotated simultaneously and in contact with each other at substantially the same peripheral speed and a multitude of irregularly and closely spaced lacerations in massed relation are produced in the tread surface.

6. The method of producing an improved skid-resistant tire tread comprising the steps of rotating the road-contacting surface of a vulcanized tread against a multiplicity of tread-piercing elements with rolling contact, said elements being of such a length as not to penetrate more than the thickness of said tread, whereby a multitude of irregularly and minutely spaced lacerations in massed relation are produced in said tread surface.

7. The method of producing an improved skid-resistant tire tread comprising the steps of providing a substantially flat surface with a plurality of upstanding tread-piercing elements and rolling the vulcanized tire over said elements so as to pierce the tread, whereby a multitude of irregularly and closely spaced lacerations in massed relation are produced in said tread surface.

8. Apparatus for increasing the skid resistance of a vulcanized tire tread comprising a frame a pair of rotatable rolls mounted on said frame, at least one of said rolls having a multiplicity of sharp lacerating elements projecting from its surface, said rolls being arranged to provide supporting means for the tire tread, and means for rotating at least one of said rolls so as to rotate the tire tread and the roll provided with the lacerating elements simultaneously and at substantially the same peripheral speed.

9. Apparatus for increasing the skid resistance of tire treads while mounted on the vehicle, comprising supports for front and rear wheels of tire-carrying pairs of rollers for each tire, tread-piercing pins on at least one roll of each of said pairs, interconnecting means for driving the same in unison when one of either of said rolls rotate, and means for driving one of said interconnected rolls to cause rotation of said tires and piercing of tire treads by said pins.

10. A device as set forth in claim 9 in which the roll is driven by a power motor.

11. A device as set forth in claim 9 in which the roll is adapted to be driven by the powered wheel of the vehicle, the tires of which are being treated.

12. The method of producing an improved skid-resistant tire embodying a tread comprising the steps of mounting a vulcanized tire for rotation, impinging the road-contacting surface of the tread of the tire against a rotatable surface having a multiplicity of tread-piercing elements, and rotating the tire and said last-mentioned surface at substantially the same peripheral speed and so as to cause said elements to pierce the tread whereby a multitude of irregularly and minutely spaced lacerations in massed relation are produced in the tread portion.

13. A vehicle tire having a vulcanized tread characterized by a road-contacting surface having multitudinous traction-increasing lacerations of minute cross-section and elongated in a generally circumferential direction, said lacerations being located in closed massed relation and extending in uniform arrangement around the tread.

14. A vehicle tire having a vulcanized tread, the road-contacting surface of the tread having multudinous traction-increasing pinhole lacerations located in closely massed relation and extending in uniform arrangement around the tire.

15. A vehicle tire having a vulcanized tread, the road-contacting surface of the tread having multitudinous traction-increasing jagged pinhole lacerations which are elongated in a generally circumferential direction, said lacerations being located in closely massed relation and extending in uniform arrangement around the tread.

16. The method of improving the skid-resistance of a vulcanized vehicle tire which comprises piercing the road-contacting surface of the tire tread by lacerating pins and then withdrawing said pins from said surface so as to produce in said surface multitudinous pinhole lacerations located in closely massed relation and extending substantially uniformly around said tread.

17. The method of improving the skid-resistance of a vulcanized vehicle tire which comprises piercing the road-contacting surface of the tire tread by rolling contact against lacerating pins so as to produce in said tread surface multitudinous pinhole lacerations located in closely massed relation and extending substantially around said tread.

18. The method of improving the skid-resistance of a vulcanized vehicle tire which comprises supporting the tire with its road-contacting surface engaged with lacerating pins carried by a rotatable roll and rotating the tire and roll at the same peripheral speed with the lacerating pins in rolling piercing contact with said tread surface so as to produce in said tread surface multitudinous pinhole lacerations in closely massed relation.

19. The method of improving the skid-resistance of a vulcanized vehicle tire which comprises repeatedly rotating the tire with the road-contacting surface of the tire tread in rolling piercing contact with lacerating pins until multitudinous pinhole lacerations in closely massed relation are produced in said tread surface.

20. Apparatus for increasing the skid-resistance of a vulcanized vehicle tire tread comprising a frame, a pair of rolls rotatably mounted on said frame in spaced opposing relation and adapted to cradle a tire for circumferential rotation, and short lacerating pins projecting from and distributed over the peripheral surface of at least one of the rolls, said pins being adapted to lacerate the road-contacting surface of the tire tread when supported in rolling contact with both rolls.

21. Apparatus for increasing the skid-resistance of a vulcanized vehicle tire tread according to claim 20 wherein the lacerating pins are of hook-like form.

22. Apparatus for increasing the skid-resistance of a vulcanized vehicle tire tread comprising a frame, a pair of rolls freely rotatably mounted on said frame in spaced opposing relation and adapted to cradle a tire for circumferential rotation, and short lacerating pins projecting from and distributed over the peripheral surface of at least one of the rolls, said pins adapted to lacerate the road-contacting surface of the tire tread when supported in rolling contact with both rolls, both of said rolls being adapted to be rotated by the rotation of the tire when supported by the rolls.

23. A vehicle tire having a vulcanized tread portion, the road-contacting surface of which is characterized by multitudinous traction-increasing pinhole lacerations located in said road-contacting surface in closely massed relation.

24. The method of treating a vulcanized tire while mounted on a vehicle comprising the steps of providing a rotatable surface having a multiplicity of tread-piercing elements, urging said piercing elements into the road-contacting surface of said vehicle tire by the weight supported by that wheel of said vehicle, and rotating the tire and rotatable surface simultaneously at substantially the same peripheral speed whereby spaced lacerations are produced in said tread surface.

25. The method of conditioning the tread surface of a tire while mounted on the wheel of a vehicle which comprises the steps of supporting said wheel at least in part on a surface provided with tread-piercing elements, whereby the tire is urged against said elements by at least a portion of the weight of said vehicle, and moving said tire in rolling contact with said elements.

CLIFFORD W. SANDERSON.

REFERENCES CITED

The following references are of record in the file of this patent:

UNITED STATES PATENTS

| Number | Name | Date |
|---|---|---|
| 1,335,124 | Midgley | Mar. 30, 1920 |
| 1,433,971 | Roberts | Oct. 31, 1922 |
| 1,452,099 | Sipe | Apr. 17, 1923 |
| 1,455,361 | Sipe | May 15, 1923 |
| 2,109,691 | D'Ayguesvives | Mar. 1, 1938 |
| 2,271,130 | Pearson | Jan. 27, 1942 |
| 2,274,855 | Wallace | Mar. 3, 1942 |
| 2,366,685 | Chambers | Jan. 2, 1945 |

FOREIGN PATENTS

| Number | Country | Date |
|---|---|---|
| 478,102 | Great Britain | Jan. 12, 1938 |

Certificate of Correction

Patent No. 2,504,090 April 11, 1950

CLIFFORD W. SANDERSON

It is hereby certified that error appears in the printed specification of the above numbered patent requiring correction as follows:

Column 6, line 75, for the word "closed" read *closely*;

and that the said Letters Patent should be read with this correction therein that the same may conform to the record of the case in the Patent Office.

Signed and sealed this 29th day of August, A. D. 1950.

[SEAL]

THOMAS F. MURPHY,
*Assistant Commissioner of Patents.*